United States Patent [19]

Dayson

[11] Patent Number: 4,646,924
[45] Date of Patent: Mar. 3, 1987

[54] MECHANICAL LOG YARDING CARRIAGE

[75] Inventor: Clive Dayson, Vancouver, Canada

[73] Assignee: Canadian Patents and Development Limited, Ottawa, Canada

[21] Appl. No.: 809,042

[22] Filed: Dec. 16, 1985

[30] Foreign Application Priority Data

Dec. 27, 1984 [CA] Canada .................................. 471083

[51] Int. Cl.[4] ............................................. B66C 21/00
[52] U.S. Cl. ...................................... 212/83; 212/122
[58] Field of Search .................................. 212/76–78, 212/83, 86, 87, 97, 99, 110, 116, 118, 122, 132; 104/173 R, 202, 204, 239; 414/41

[56] References Cited

U.S. PATENT DOCUMENTS

| | | | |
|---|---|---|---|
| 1,543,473 | 6/1975 | Fayette | 212/76 |
| 3,718,262 | 2/1973 | Lysons et al. | 212/122 |
| 3,820,663 | 6/1974 | Junes et al. | 212/99 |
| 3,863,774 | 2/1975 | Brandt | 212/122 |
| 3,863,776 | 2/1975 | Harman | 414/41 |
| 4,127,197 | 11/1978 | Dumont | 212/122 |
| 4,164,289 | 8/1979 | Haliewicz | 212/76 |
| 4,262,811 | 4/1981 | Montague | 212/122 |
| 4,515,281 | 5/1985 | Maki | 212/76 |

FOREIGN PATENT DOCUMENTS 198377  7/1966  U.S.S.R. .............................. 212/122

Primary Examiner—Galen Barefoot
Assistant Examiner—Stephen P. Avila
Attorney, Agent, or Firm—Robert G. Hendry

[57] ABSTRACT

The cable carriage is for use with a skyline log yarding system. The carriage runs and is supported on the fixed skyline. One main-haulback cable connected to winch drums at each end moves the carriage back and forth on the skyline. A tagline wound on a tagline drum is fed out as needed and is used to pull a log toward the carriage, raise it and hold it as the carriage is moved.

4 Claims, 5 Drawing Figures

4,646,924

MECHANICAL LOG YARDING CARRIAGE

SUMMARY OF THE INVENTION

This is accomplished by providing a pair of idler pulleys on pivoted arms, a capstan attached to the tagline drum, a skyline brake, and clutch on the capstan. The mainline hauling cable passes around one pulley then wraps around the capstan a number of times before passing over the other pulley and exiting in the opposite direction as the haulback line. If the main line drum is braked as the haulback line is hauled in, the tension in the cable causes the idler pulleys to move inward and apply the skyline brake and release the normally engaged clutch on the capstan, and the capstan and the tagline drum then turn to reel out the tagline. Conversely, if the haulback line drum is braked as the main line is hauled in the tagline and the log attached to it are reeled in and the log raised. This having been done, tension is removed from the haulback cable thus releasing the skyline brake and locking up the tagline drum for movement of the carriage and log toward the unloading area.

This invention relates to skyline carriages and particularly to carriages for use in log yarding operations.

The basic skyline system used to transport felled trees to an area where the trees can be loaded on trucks includes a skyline carriage which traverses the logging area on a skyline cable and is controlled by main and haulback cables. A tagline or the mainline draws the log toward the carriage and at least one end of the log is elevated until the carriage reaches the unloading zone.

All known log yarders have certain deficiencies. For instance, in the simplest systems a high tension must be maintained in the haulback line in order to keep at least the tethered end of the log off the ground. This high tension is achieved by braking the drum of the haulback winch as the line is pulled out. This results in energy loss and brake wear.

Since the logs to be transported are not always directly under the skyline, slack is required in the line that is to be attached to the log. Pulling the slack by hand can be difficult or often impossible in large systems and/or on steep terrain.

The normal way to avoid the first of the above problems of energy loss and brake wear is to provide a simple lock system consisting of a dog on the log lifting line which engages a latch in the carriage. The haulback line can then be allowed to unspool freely from its winch. The latch is unlocked at the unloading point by a carriage stop on the skyline.

A second method of avoiding the problem of energy loss and brake wear is to interlock the main and haulback winches with a continuously variable ratio drive so that the outgoing haulback line can help to drive the incoming main line.

The normal method of pulling the slack is to add another winch to the system for this purpose.

The drawbacks of existing solutions is that the use of dogs and latches as described has the disadvantage that once the load is locked up it cannot be lowered until the carriage reaches the unloading dog on the skyline. Also those systems as shown for example in U.S. Pat. No. 3,820,663 using radio controlled clamping systems are expensive. The manually controlled systems as shown in U.S. Pat. No. 3,863,776 are difficult to use.

The interlocked main and haulback winch systems are effective but as they require use of an infinitely variable ratio transmission they are expensive.

The addition of another winch for pulling slack adds further cost and complication to the winching system.

It is therefore an object of the present invention to provide an improved all-mechanical carriage which provides a lock-up and slack pulling capability without requiring any other changes or additions to the standard skyline yarding system other than the use of a single main/haulback line instead of two separate lines.

A further object of this invention is the provision of a logging carriage which is less expensive than prior devices particularly radio controlled carriages.

A still further object of the present invention is the provision of a carriage which is reliable, simple to use and easier to maintain in good working order.

Accordingly the present invention provides a skyline carriage of the type for traversing a skyline cable and for having a combination main line and haulback cable operatively connected thereto and to the ends of which main and haulback winches are connected, the improvement comprising a capstan and a pair of idler pulleys in said carriage for receiving said main and haulback cable so as to be entrained thereby including one or more wraps of said main and haulback cable around said capstan, a tagline drum secured to said capstan for rotation therewith for receiving a tagline cable, clutch means to normally prevent rotation of said capstan and said tagline drum to lock up said tagline and log, means to disengage said clutch means, a brake on said carriage for clamping onto said skyline, both said pulleys being pivotally mounted so that tension on said main and haulback lines created by said main and haulback winch drums causes said pulleys to move inwardly thereby operating means to apply said skyline brake and said means to disengage said clutch means, while said main line haulback cable continues to move and rotate said capstan and tagline drum to winch in said tagline and a log secured thereto or to feed out slack tagline.

In the accompanying drawings which illustrate an embodiment of the invention.

Figure 1:
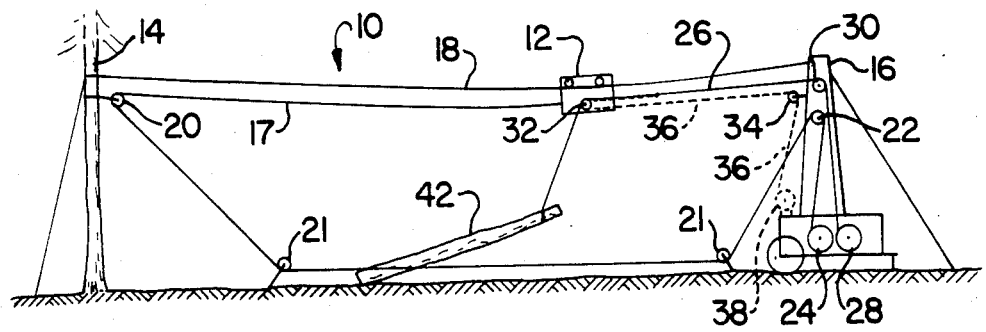
FIG. 1 is a graphic depiction of a conventional logging system including the skyline carriage and cables.

Referring now in detail to the drawings, the conventional log yarding system shown at 10 in FIG. 1 includes a skyline carriage indicated generally at 12 and spar trees 14 and 16 a skyline 18 on which the carriage is suspended extends between the spars 14 and 16. A haulback cable 17 secured to the carriage 12 passes through a sheave or pulley 20 on the spar tree 14. The haulback cable 17 then passes through suitable pulleys 21 on the ground, through a pulley 22 on the spar 16 and is then wound on a winch drum 24. A main line 26 which is wound on the second winch drum 28 passes over a pulley 30 on the spar tree 16 and over a pulley 32 on the carriage 12 and is then attached to a log 42. A slack pulley line 36 (shown in dotted lines) secured to the main line 26 passes over the pulley 32 a pulley 34 on the spar tree 16 and is wound on a winch drum 38.

In operation, to keep the tethered end of the log 42 raised while the carriage 12 is hauled back to a loading zone, high tension must be maintained in the haulback line cable 17. This high tension is achieved by braking the drum of the haulback winch 24 while the main line cable 26 is winched in by the winch drum 28.

Figure 2:
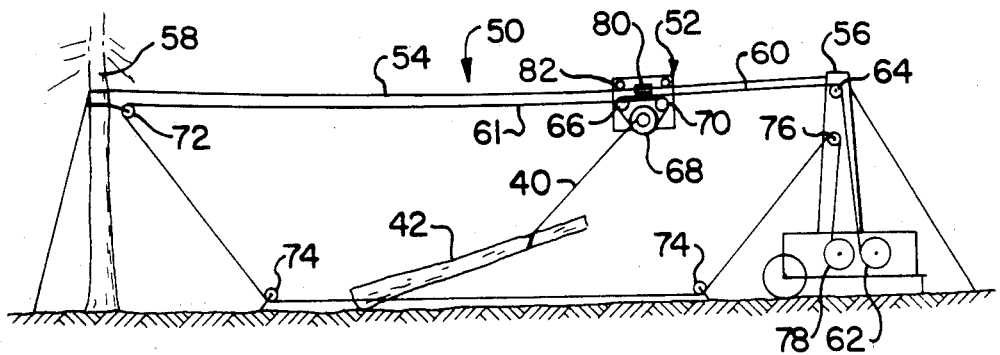
FIG. 2 is a graphic depiction of the logging system of this invention.

In FIG. 2 the log yarding system of this invention is shown generally at 50. The system 50 includes a skyline carriage indicated generally at 52 (to be described in greater detail below) and a skyline 54 suspended between spar trees 56 and 58 which support the carriage 52. It will be appreciated that the spar tree 56 may be in the form of a yarder mast of the type adapted to move from one logging area to another. A combination main line cable and a haulback cable 60/61 has its one end wound on winch drum 62. From drum 62 the mainline part 60 of the cable passes over pulley 64 on spar tree 56, pulley 66 on the carriage 52 and then is wrapped a number of times around a capstan 68 before passing over a second pulley 70 on the carriage. The haulback part 61 of the cable then passes over a pulley 72 on the spar tree 58 and through sheaves or pulleys 74 secured to the ground and through a pulley 76 before being wound on winch drum 78. A brake system indicated generally at 80 is provided on the carriage 52 to engage the skyline 54. The carriage 52 includes a housing 82 consisting of two spaced apart plates 84 and 86 (see FIGS. 4 and 5) in which skyline pulleys 88 and 90 are rotatably mounted to ride on the skyline cable 54

Figure 3:
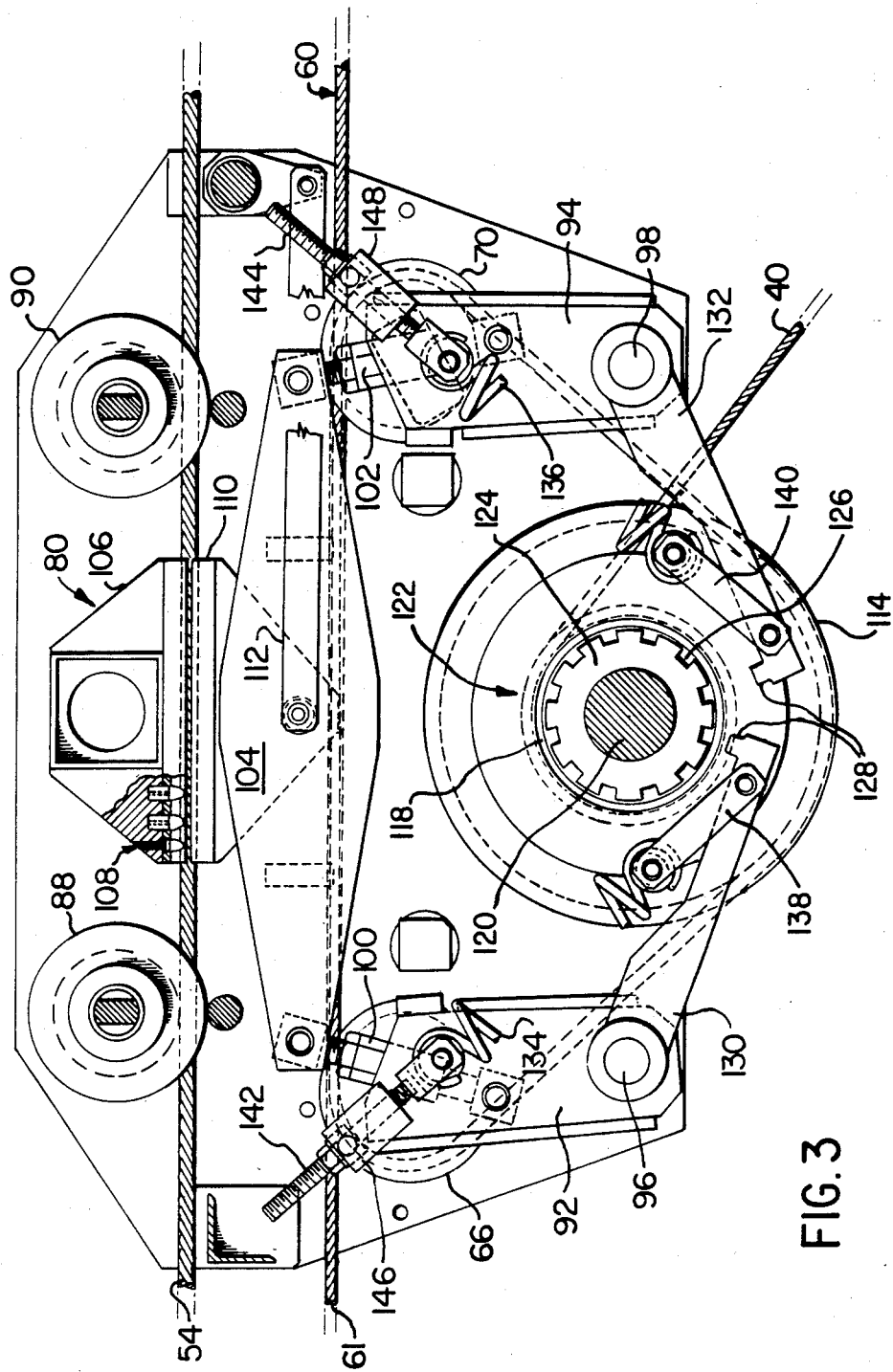
FIG. 3 is a front elevational view of the logging carriage of this invention without the front cover plate.

As shown more clearly in FIG. 3 the pulleys 66 and 70 are mounted on pivot arms 92 and 94 respectively pivotally attached to the housing at their lower ends at points 96 and 98. Adjustable links 100 and 102 are pivotally connected at the lower ends to mid points of the arms 92 and 94 having their upper ends connected to a bar 104. The bar 104 is in turn connected to a lower brake shoe 110 of the brake assembly 80. An upper shoe 106 which is normally fixed but can be adjusted by means of screws 108 so that it is aligned with and almost touching the skyline 54. The brake assembly 80 also includes a horizontal link 112 provided to prevent sideways movement of the bar 104 and lower shoe 110.

Figure 4:
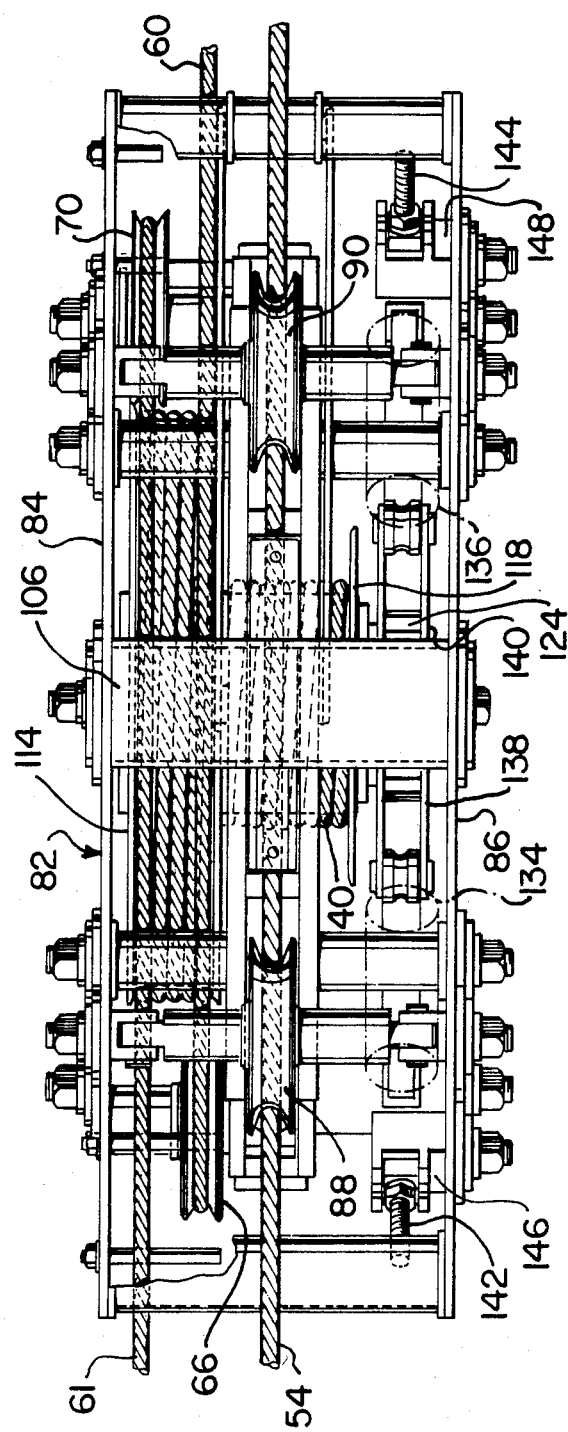
FIG. 4 is a top plan view of the carriage of FIG. 3.
Figure 5:
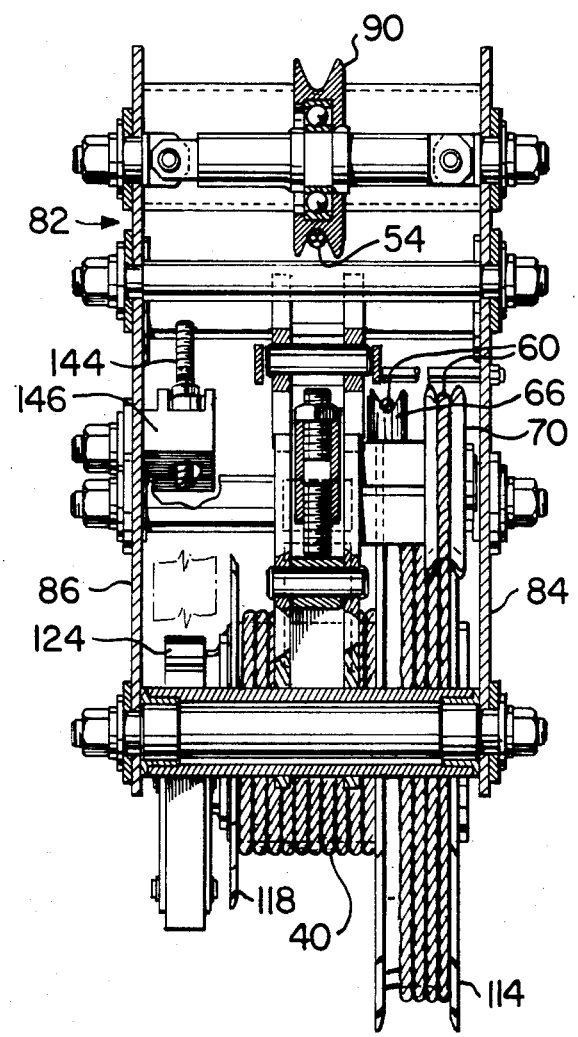
FIG. 5 is an end view of a carriage.

A capstan 114 and a tagline drum 118 integral with the capstan 114 so as to rotate therewith is shown more clearly in FIG. 4. The capstan 114 and drum 118 are supported on a shaft 120.

A clutch assembly 122 secured to the tagline drum 118 is the type known as a dog clutch and has a clutch plate 124 provided with notches 126 on its periphery. Dogs 128 on ends of levers 130 and 132 are received in the notches 126 of the clutch plate 124. The other end of the levers 130 and 132 are fixedly secured to the lower ends of the pivot arms 92 and 94 respectively.

The levers 130 and 132 are urged toward the clutch plate 124 by helical springs 134 and 136 respectively. The springs 134 and 136 are interconnected with the levers 130 and 132 by links 138 and 140. The upper ends of the springs 134 and 136 are secured to adjustment screws 142 and 144 which extend through pivot blocks 146 and 148.

OPERATION OF THE CARRIAGE

In operation assuming all the cables are in place and connected properly to the carriage 52 and the winch drums 62 and 78 an operator will move the carriage 52 to the log loading area by paying out main line 60 and winching in haulback line 61 on drum 78. During this procedure the dog clutch 122 remains locked up, the capstan 114 does not rotate and the brake 80 is not applied since no tension is applied to the cable to move the idler pulleys 66 and 70 inwardly.

On reaching the logging area increased tension is provided in the main cable 60 by braking the drum 62. This causes the skyline brake 80 to be applied, the carriage 52 comes to rest, the dog clutch 122 is released and the capstan 114 and the tag line drum 118 rotate so as to unreel sufficient tagline 40 to reach a log to be secured to it. The winch drum 62 is then driven in the opposite direction to cause the main line 60 to move towards the spar tree 56 with the haulback line 61 maintained at a high tension by braking the winch 78 as it unspools. The skyline brake 80 is still applied, the carriage 52 is stationary. The dog clutch 122 is disengaged and the capstan 114 and the tag line drum 118 turn in the opposite direction to haul a log from the side to the skyline 54 and to raise the log's tethered end. To transport the log 42 from the logging area to the spar tree 56 the brake on the haulback line winch 78 is released so that the tension in the haulback line 61 is reduced, the skyline brake 80 is released, the clutch 122 engages locking the tag line drum and the capstan and the carriage 52 and the log 42 are hauled by the main line 60 towards the spar tree 56. To lower the log 42 at the unloading point near the spar tree 56 the procedure is the same as that used for unreeling the tag line described above.

I claim:

1. A skyline carriage of the type for traversing a skyline cable and for having a combination main line and haulback cable operatively connected thereto and to a main winch drum and to a haulback winch drum, the improvement comprising a capstan and a pair of idler pulleys in said carriage, for receiving said main and haulback cables so as to be entrained thereby including one or more wraps of said main and haulback cable around said capstan, a tagline drum secured to said capstan for rotation therewith for receiving a tagline cable, clutch means to normally prevent rotation of said capstan, means to disengage said clutch, means to brake on said carriage for engaging said skyline, at least one of said pulleys being pivotally mounted so that tension on said main and haulback lines by said main and haulback winch drums causes one of said pulleys to move inwardly thereby operating means to apply said skyline brake and said means to disengage said clutch means, while said main line haulback cable continues to move and rotate said capstan and tagline drum to winch in said tagline and a log secured thereto or feed out said tag line.

2. A skyline carriage as claimed in claim 1 wherein both said idler pulleys are mounted on pivotal arms.

3. A skyline carriage as claimed in claim 1 wherein said clutch means is a dog clutch having dogs on arms to engage notches in a clutch plate, said arms being activated by said pivotal arms on which said idler pulleys are mounted and springs normally urge said dogs toward said clutch wherein said skyline brake is normally disengaged.

4. A skyline carriage as claimed in claim 1 wherein said skyline brake is activated by links on said pivot arms connected to a bar which urges a lower brake shoe toward said skyline cable and a fixed upper brake shoe.

* * * * *